United States Patent
Enomoto

(10) Patent No.: US 9,049,400 B2
(45) Date of Patent: Jun. 2, 2015

(54) IMAGE PROCESSING APPARATUS, AND IMAGE PROCESSING METHOD AND PROGRAM

(71) Applicant: CANON KABUSHIKI KAISHA, Tokyo (JP)

(72) Inventor: Makoto Enomoto, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 13/905,891

(22) Filed: May 30, 2013

(65) Prior Publication Data

US 2013/0329263 A1    Dec. 12, 2013

(30) Foreign Application Priority Data

Jun. 6, 2012  (JP) ................. 2012-129016

(51) Int. Cl.
   *H04N 1/40*     (2006.01)
   *H04N 1/00*     (2006.01)
   *G06K 9/00*     (2006.01)

(52) U.S. Cl.
   CPC .......... *H04N 1/40* (2013.01); *H04N 2201/0068* (2013.01); *H04N 1/00225* (2013.01); *H04N 1/00331* (2013.01); *H04N 2201/0081* (2013.01); *G06K 9/00469* (2013.01)

(58) Field of Classification Search
   USPC .......... 358/470, 1.11, 1.9, 3.31, 2.1; 382/192, 382/177, 176
   See application file for complete search history.

(56) References Cited

U.S. PATENT DOCUMENTS

| | | | |
|---|---|---|---|
| 5,349,368 A * | 9/1994 | Takeda et al. | 345/684 |
| 5,680,478 A | 10/1997 | Wang et al. | |
| 5,689,342 A | 11/1997 | Nakatsuka | |
| 6,959,121 B2 * | 10/2005 | Kumazawa | 382/294 |
| 7,391,917 B2 | 6/2008 | Ohta et al. | |
| 7,664,321 B2 | 2/2010 | Fukuoka et al. | |
| 8,396,294 B2 | 3/2013 | Enomoto et al. | |
| 8,503,773 B2 | 8/2013 | Kanatsu et al. | |
| 2002/0126905 A1 * | 9/2002 | Suzuki et al. | 382/229 |
| 2007/0217687 A1 * | 9/2007 | Arima | 382/224 |
| 2010/0275113 A1 * | 10/2010 | Bastos Dos Santos et al. | 715/227 |
| 2012/0023399 A1 * | 1/2012 | Hoshino et al. | 715/256 |
| 2012/0120432 A1 * | 5/2012 | Hirohata et al. | 358/1.13 |
| 2012/0134580 A1 * | 5/2012 | Murakami et al. | 382/163 |

FOREIGN PATENT DOCUMENTS

| | | |
|---|---|---|
| JP | H08-147410 | 7/1996 |
| JP | 4251629 | 4/2009 |

* cited by examiner

*Primary Examiner* — Jerome Grant, II
(74) *Attorney, Agent, or Firm* — Fitzpatrick, Cella, Harper & Scinto

(57) ABSTRACT

When an electronic document is to be generated from an image of a document, reproduction of both an appearance of the document image and a logical structure is difficult because of format limitations imposed on the electronic document. According to the present invention, from among column arrangements allowed by the specifications of the electronic document, a column arrangement is selected by using which the positions of character areas in an input image and the logical structure analyzed from the input image can be most appropriately reproduced, and is used to generate an electronic document.

4 Claims, 16 Drawing Sheets

| AREA ID | WRITING DIRECTION OF CHARACTERS | COORDINATES (x1,y1)-(x2,y2) | CHARACTER STRING | NUMBER OF CHARACTERS | CHARACTER SIZE | NUMBER OF LINES | READING ORDER |
|---|---|---|---|---|---|---|---|
| 401 | HORIZONTAL | (20,50)-(55,70) | "Title" | 5 | 24 | 1 | 1 |
| 402 | HORIZONTAL | (75,45)-(130,80) | "This is the first ..." | 46 | 13 | 3 | 2 |
| 403 | HORIZONTAL | (10,90)-(140,135) | "This is the second ...." | 119 | 14 | 4 | 3 |
| 404 | HORIZONTAL | (150,45)-(180,95) | "The third paragraph." | 19 | 14 | 4 | 4 |
| 405 | HORIZONTAL | (150,110)-(175,145) | "The 4th." | 8 | 14 | 3 | 5 |
| 406 | VERTICAL | (190,45)-(200,145) | "ABCDEFGHIJ..." | 10 | 14 | 1 | 6 |
| 407 | HORIZONTAL | (15,170)-(190,205) | "This region is the last ..." | 104 | 14 | 3 | 7 |
| 408 | HORIZONTAL | (85,270)-(110,280) | "Page1" | 5 | 10 | 1 | 8 |

FIG.5

| COLUMN ARRANGEMENT CANDIDATE | CHARACTER AREA | | | | SCORE (NUMBER OF AREAS FOR CONTINUITY) |
|---|---|---|---|---|---|
| 803 | 401 / 1 | 403 / 3 | 404 / 4 | 405 / 5 | 2 |
| 804 | 402 / 2 | 403 / 3 | 404 / 4 | 405 / 5 | 3 |
| 805 | 401 / 1 | 402 / 2 | 404 / 4 | 405 / 5 | 2 |
| 900 | 401 / 1 | 402 / 2 | 403 / 3 | 405 / 5 | 2 |

FIG.10

```
<WordProcesser>
<Document>
<Section>
<Column num="2" width="145,35" >
<Paragraph left_margin="75" size=14>This is a first ….</Paragraph>
<Paragraph left_margin="10" size=14>This is a second ….</Paragraph>
<BrakeColumn/>
<Paragraph left_margin="75" size=14>The third Paragraph ….</Paragraph>
<Paragraph left_margin="75" size=14>The 4th.</Paragraph>
</Column>
</Section>
<Section>
<Paragraph left_margin="15" size=14>This region is last ….</Paragraph>
</Section>
</Document>
<Text x="20" y="50" size="24">Title</Text>
<Text x="190" y="45" size="10" orient="Vertical">ABCDEFGH</Text>
<Text x="85" y="270" size="10">Page1</Text>
</WordProcesser>
```

FIG.11

| AREA ID | TYPE | WRITING DIRECTION OF CHARACTERS | COORDINATES (x1,y1)-(x2,y2) | CHARACTER STRING | NUMBER OF CHARACTERS | CHARACTER SIZE | NUMBER OF LINES | READING ORDER |
|---|---|---|---|---|---|---|---|---|
| 1401 | CHARACTER | HORIZONTAL | (10,50)-(135,95) | "This is the first..." | 112 | 14 | 4 | 1 |
| 1402 | CHARACTER | HORIZONTAL | (20,140)-(60,150) | "Image caption" | 13 | 10 | 1 | 2 |
| 1403 | CHARACTER | HORIZONTAL | (80,140)-(120,150) | "Table caption" | 13 | 10 | 1 | 3 |
| 1404 | CHARACTER | HORIZONTAL | (150,50)-(190,150) | "The second paragraph..." | 109 | 12 | 10 | 4 |
| 1410 | PHOTOGRAPH | - | (20,110)-(60,135) | - | - | - | - | |
| 1420 | CHARACTER | - | (80,110)-(120,134) | - | - | - | - | |

FIG.15

```
<WordProcesser>
 <Document>
  <Section>
   <Column num="2" width="135,55">
    <Paragraph left_margin="10" size=14>This is the first para ···</Paragraph>
    <BrakeColumn/>
    <Paragraph left_margin="15" size=12>The second para ···</Paragraph>
   </Column>
  </Section>
 </Document>
 <Text x="20" y="140" size="10">Image caption</Text>
 <Text x="80" y="140" size="10">Table Caption<</Text>
 <Image x="20" y="110" id="image01"/>
 <Table x="80" y="110" col="20,20" row="6,6,6,6" > ··· </Table>
</WordProcesser>
```

IMAGE PROCESSING APPARATUS, AND IMAGE PROCESSING METHOD AND PROGRAM

BACKGROUND OF THE INVENTION

1. Field of the Invention

The present invention relates to an image processing apparatus that employs either a paper document, or image data for a document, to generate electronic document data that can be edited, and an image processing method and a program therefor.

2. Description of the Related Art

Recently, it has become common practice for documents to be prepared not merely by inputting characters, but also by incorporating the products of high level functions, such as script provided using font effects or drawings prepared by graphics programs, or by including photographs.

However, when a document is to be created that includes more complex contents, a great deal more labor is required to prepare the document in its entirety, from the beginning. Therefore, it is desirable that part of a previously prepared document be employed unchanged, or that, in the event, a formerly processed and edited document be utilized.

Further, opportunities for the electronic distribution of documents have been increased by the spread of networks, as represented by the Internet, while, furthermore, the distribution of electronic documents that have been reproduced on paper is also frequently employed.

There is a technique proposed according to which, even when only a paper document is on hand as a distributed document, the paper document can be employed to obtain the contents of the document as reusable data. For example, in the description provided for Japanese Patent No. 4251629, a paper document is electronically scanned by an apparatus and a database search is performed to obtain a document whose contents match those of the scanned document, so that the data provided by the thus obtained document can be used for the scanned document. But even in a case wherein a document having the same contents cannot be found in the database, the data obtained by scanning the paper document can be converted into reusable data, and the contents of the scanned document can be reused.

For this data conversion, there is a conventional technique, called the OCR technique, for converting character information included in image data obtained by scanning a paper document (hereinafter referred to as document data) into easily reusable electronic data. According to Japanese Patent No. 4251629 described above, a sentence structure component, such as the order in which characters are read, is analyzed in order to easily process the character information obtained by the OCR. Based on the thus obtained information for the order in which characters are read, the character information is loaded into an electronic file, such as an XML file, to generate an electronic document. As a result, there is an improvement in usability.

However, in a case wherein the structure employed for a paper document is to be reproduced and output is to be provided by employing a column layout to generate an electronic document, the document layout that appears on the paper document may not be reproduced, depending on an output specification for an electronic document format that is employed. For example, when a format allowing text to flow from page to page, in order, i.e., a word processing document format is employed, a structure wherein a column layout includes another type of column layout cannot be reproduced, and further, a layout such as one for a newspaper, where the sentence order does not match the coordinate sequence, can also not be reproduced. It should be noted that a column layout is an arrangement of characters and graphics constructed by breaking up text among two or more columns.

SUMMARY OF THE INVENTION

An image processing apparatus of the present invention for generating an electronic document from an image comprises: an identification unit for identifying character areas in the image; a character recognition unit for performing a character recognition process for the identified character areas; an analysis unit for analyzing a logical structure that represents a logical relationship between the identified character areas; a selection unit for selecting, from among column arrangements allowed by specifications of the electronic document, a column arrangement by using which positions of the identified character areas in the image and the analyzed logical structure can be most appropriately reproduced; and a generation unit for generating the electronic document based on the selected column arrangement and a result of the character recognition process, wherein the generated electronic document includes information corresponding to character areas whose positions in the image are reproduced as a main body of the selected column arrangement, and information corresponding to character areas whose positions in the image are not reproduced as the main body of the selected column arrangement.

According to the image processing apparatus of this invention, when electronic document data is generated with a format for which a limitation is imposed on the output specification from document image data, a good reproduction ratio can be achieved for both the layout and the local structure.

Further features of the present invention will become apparent from the following description of exemplary embodiments (with reference to the attached drawings).

BRIEF DESCRIPTION OF THE DRAWINGS

FIG. 5 is a diagram showing example logical structure analysis results according to the first embodiment;

FIG. 10 is a diagram showing example scores for logical structures according to the first embodiment;

FIG. 11 is a diagram showing an example description for an electronic document according to the first embodiment;

FIG. 15 is a diagram showing example logical structure analysis results according to the third embodiment; and FIG. 16 is a diagram showing an example description of an electronic document according to the third embodiment.

DESCRIPTION OF THE EMBODIMENTS

The preferred embodiments for carrying out the present invention will now be described by employing the accompanying drawings. It should be noted, however, that components described in the embodiments are merely examples, and the scope of the present invention is not limited to them.

First Embodiment

Figure 1:
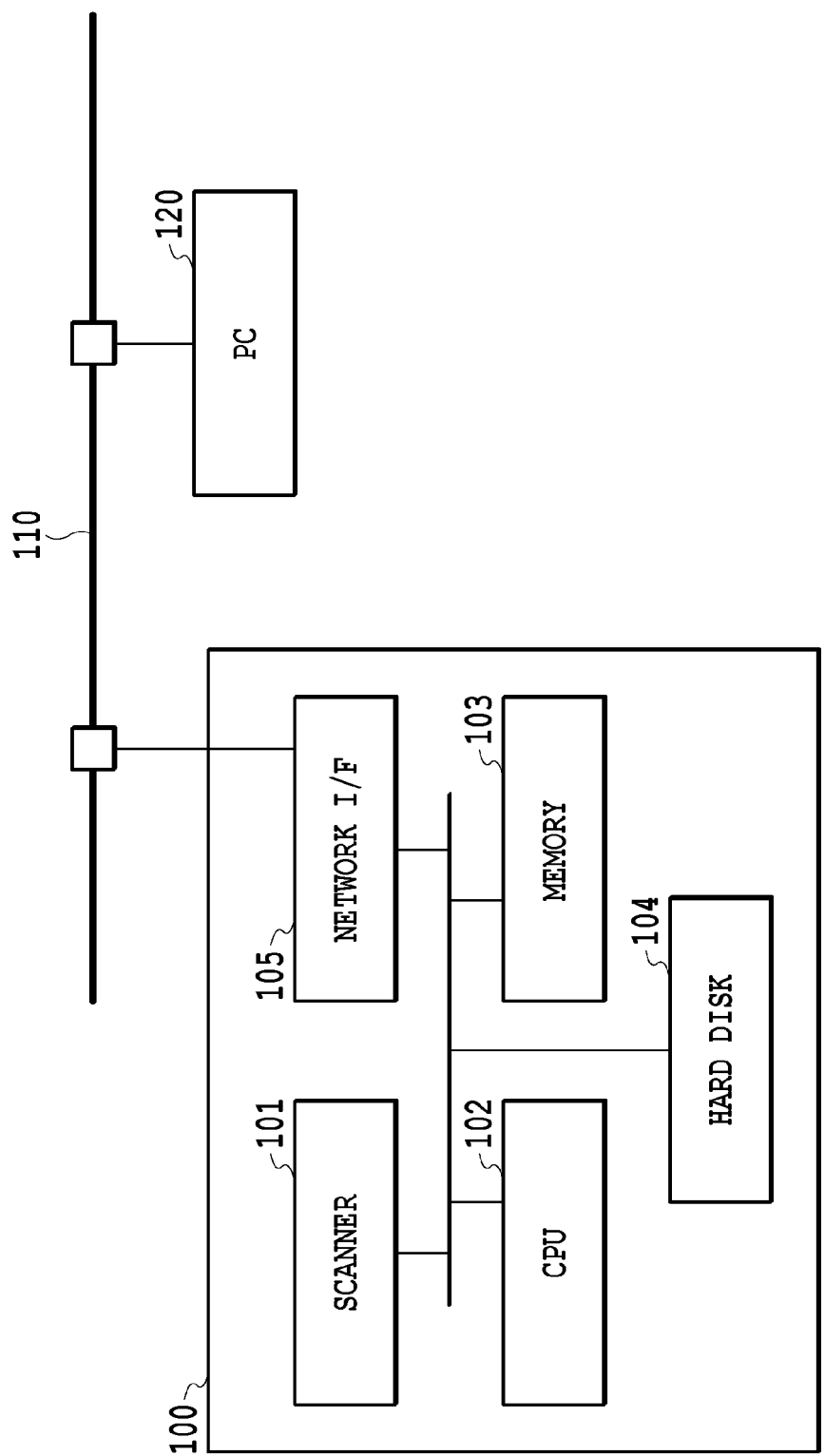
FIG. 1 is a diagram illustrating an example system configuration for the present invention.

FIG. 1 is a diagram showing an example system configuration employing an image processing apparatus according to a first embodiment of the present invention. An image processing apparatus 100 includes a scanner 101, a CPU 102, a memory 103, a hard disk 104 and a network I/F 105. The components of the image processing apparatus 100 are not limited to these, however, and other components, generally provided for an image processing apparatus, are also included. The scanner 101 converts, into image data, page layout information for a document that has been scanned. The CPU 102 executes a program for performing a document creation processing for the image data, and controls various other processing. The memory 103 is used as work memory during execution of the program, and is also used for temporary data storage. The hard disk 104 is a storage unit for storing the program and data. The network I/F 105 is an interface for the input and output of data, with respect to an external apparatus.

The image processing apparatus 100 is connected, via the network I/F 105, to either a wired or a wireless network 110, such as a LAN or the Internet. A general-purpose personal computer (PC) 120 is also connected to the network 110. The PC 120 can display and edit data that is received from the image processing apparatus 100 via the network 110.

Figure 2:
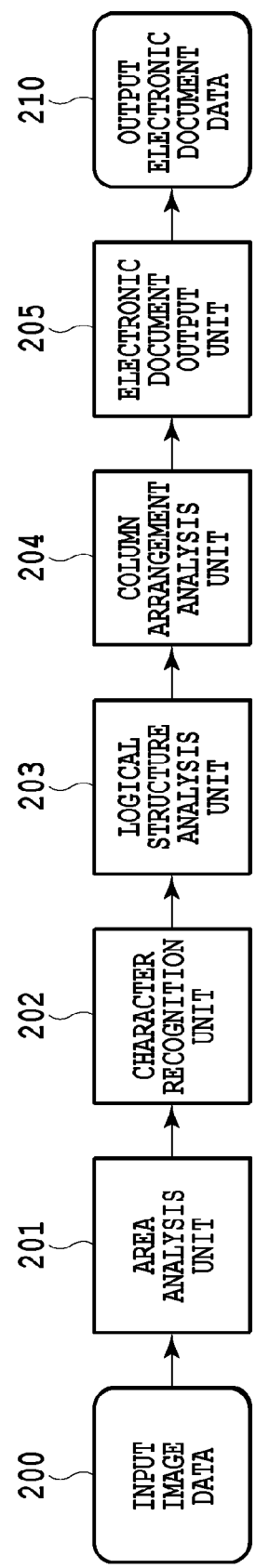
FIG. 2 is a block diagram illustrating the arrangement employed for the electronic document generation processing according to a first embodiment of the present invention.

FIG. 2 is a block diagram illustrating the processing flow for the electronic document creation performed by the CPU 102 of the image processing apparatus 100. The electronic document creation processing flow includes input image data 200, output electronic document data 210 and processing blocks 201 to 205. An outline description of these data and the respective processing blocks will now be provided.

The input image data 200 consists of image data to be employed for the electronic document creation processing. The input image data 200 is document image data obtained, for example, by photoelectrically converting, into electronic pixel information, the contents of a paper document that has been scanned by the scanner 101 of the image processing apparatus 100. The input image data 200 may also be either document image data externally supplied via the network I/F 105, or document image data generated by the image processing apparatus 100. In the state wherein the input image data 200 is stored either in the memory 103 or on the hard disk 104, the processing block procedures shown in FIG. 2 are actually performed.

The output electronic document data 210 is electronic data output as a result of the performance of the electronic document creation processing. The output electronic document data 210 includes character data, drawing data, photographic data and table data that have been extracted from the input image data 200 and are represented by employing a form with which a user can display and edit data while employing the application program of a personal computer. In this embodiment, the output electronic document data 210 is document data outputted in accordance with the typesetting rule of a predetermined format, the document data including the extracted character data which are inserted in accordance with an appropriate column arrangement selected by the column arrangement analysis unit 204. A character area corresponding to character data inserted into a main body of the document data having the predetermined format is called as a body area (an area of body text). Furthermore, each document having the predetermined format has only one main body, while the main body includes a plurality of body areas, divided into sections and/or columns.

For horizontal writing scripts, the document form of the body area comprises sections separated along the vertical axis and separate columns in each of the sections along the horizontal axis. For scripts of vertical wiring, the text area comprises sections separated along the horizontal axis and separate columns in each of the sections along the vertical axis. That is, the text area includes one or more sections, each of which includes one or more columns.

For electronic document data that is output in this embodiment, it is assumed that an additional section or a different column setting cannot be provided inside the column, or the writing direction of characters cannot be changed in the middle of the main body because of the limitation imposed on the format specification. Further, the electronic document data in this embodiment can include, separate from the main body, a character area that can be arranged at a desired position in a document. This character area is called an arbitrary arranged character area.

The respective processing blocks shown in FIG. 2 will now be described. The processing in respective processing blocks are to be performed by the CPU 102 in accordance with a program that is read from a storage unit, such as the memory 103 or the hard disk 104.

The area analysis unit 201 employs a well-known area analysis technique to identify character areas that are included in the input image data 200. A well-known area analysis technique is the one described, for example, in the specification for U.S. Pat. No. 5,680,478.

The character recognition unit 202 performs a character recognition processing, for character areas identified by the area analysis unit 201, to identify characters included in the character areas, and obtains a character code string of identified characters. In addition to the character code string, the results obtained by the character recognition processing may also include, for respective characters, color information, coordinate information and document form information, such as the a character size and a character pitch or a line pitch, that is estimated in association with the character recognition processing.

The logical structure analysis unit 203 analyzes the logical structure of the document contents based on the positions of the character areas, and the number of characters, obtained by the area analysis unit 201. The logical structure represents a semantic and logical relationship of the respective character areas of the text, and is attribute information, such as the order in which character areas are read, the titles and the contents of the respective character areas and the captions attached to diagrams. In this embodiment, the well-known technique is especially employed to estimate the reading order, based on the position information for the character areas. For example, in Japanese Patent Laid-Open No. H08-147410 (1996), a document image is analyzed, and character areas included in the document image are sorted into classes, such as an article, a column and a paragraph. In a horizontal writing script case, the reading order is provided for the respective classes based on their positional relationships, e.g., reading from the top is assigned for the articles, reading from the left is assigned for the columns, and reading from the top is assigned for the paragraphs.

The column arrangement analysis unit 204 employs the processing results obtained by the area analysis unit 201 and the logical structure analysis unit 203, and performs an analysis to select an appropriate column arrangement that should be employed for the output electronic document data 210. Specifically, from among those column arrangements allowed by the specifications of the output electronic document data 210, the column arrangement analysis unit 204 selects a column arrangement by using which the positions, in the input image data 200, of the character areas that are identified by the area analysis unit 201, and the logical structure analyzed by the logical structure analysis unit 203 can most readily be reproduced. The processing performed by the column arrangement analysis unit 204 will be described in detail later.

The electronic document generation unit 205 generates the output electronic document data 210 based on the identified character areas, the character recognition results and the column arrangement that is selected by analysis. Specifically, the thus generated output electronic document data 210 includes, at the least, information (e.g. character recognition result) of character areas whose positions in the input image data 200 can be reproduced as a main body of the column arrangement selected by the column arrangement analysis unit 204, and information (e.g. attribute information and character recognition result) of character areas whose positions in the input image data 200 cannot be reproduced as the main body of the selected column arrangement. The electronic document output unit 205 may either generate one electronic document page for one set of input image data, or generate one set of multi-page electronic documents for multiple sets of input image data. The thus generated, output electronic document data 210 will be described in more detail later, while referring to FIGS. 11, 12A and 12B.

The processing in the column arrangement analysis unit 204 will now be described while referring to the flowchart in FIG. 3, and more details of this processing (specific example) will be given later while referring to FIGS. 4 to 10.

At step S301, the column arrangement analysis unit 204 determines the writing direction of characters. The writing direction of characters is the orientation in which characters are written in a document. The column arrangement analysis unit 204 employs vertical writing/horizontal writing information for all of the character areas obtained by the area analysis unit 201, and determines the writing direction of characters for the entire document. In this embodiment, the writing direction of characters in the area for which the total number of characters is the greatest is determined to be the writing direction of characters for the entire document (when one document consists of a plurality of pages, the writing direction of characters is determined for each page). The method for determining the writing direction of characters described here is merely an example, and the method is not limited to this. The total of area sizes for the respective writing directions may be employed, or a value obtained by UI may also be employed to determine the writing direction of characters. In the following description, unless otherwise noted, the writing direction of characters for a document is determined to be horizontal writing. For vertical writing, the horizontal direction need only be replaced with the vertical direction when reading.

At step S302, the column arrangement analysis unit 204 examines character areas included in a document to identify a non-body area. The non-body area is a character area that is included in a document and is not a body area. In this embodiment, when it is ascertained at step S301 that, for example, the writing direction of characters of a document is horizontal writing, the character area of vertical writing is identified as a non-body area. Further, an area located at the upper end of the document is defined as a header, while an area located at the lower end of the document is defined as a footer, and character areas present in these areas are excluded from the body area. This processing is merely an example, and as another example, information such as the accuracy of the character recognition, may be employed to identify a non-body area or a noise area, and this area may be excluded from a body area. A character area identified as a non-body area is not counted as an object to be processed by the following processing (steps S303 to S307) in FIG. 3. That is, the areas obtained by excluding the non-body areas from the character areas of the document are identified as body areas, and the processing described below is to be performed for the body areas.

At step S303, the column arrangement analysis unit 204 separates, by section, the body areas that are areas obtained by excluding the non-body areas from the character areas at step S302. Specifically, the column arrangement analysis unit 204 employs the writing direction of characters obtained at step S301, and extracts the delimiter positions of the sections. In order to extract section delimiter positions, a projection of the character areas is performed along the horizontal axis in a case wherein the writing direction of characters is horizontal writing, or along the vertical axis in a case wherein the writing direction of characters is vertical writing. The portion where a projection is not present is extracted as a section delimiter position. During this processing, since a projection is performed, only the positions at which the text area can be delimited by sections are extracted.

At step S304, from among a plurality of sections identified based on the section delimiter positions extracted at step S303, the column arrangement analysis unit 204 selects one of unprocessed sections as objects to be processed.

At step S305, the column arrangement analysis unit 204 selects, as column arrangement candidates (arrangement candidates) employed to arrange the character areas that are included in the sections selected at S304, column arrangements allowed by the output specification of the output electronic document data 210. That is, the column arrangement analysis unit 204 selects, as the arrangement candidates, column arrangements that provide a high reproduction ratio of the positions of the character areas that are identified and analyzed from the input image data 200. Further, in order to obtain more appropriate column arrangement candidates, the column arrangement analysis unit 204 can obtain section delimiter candidates from among the sections selected to be processed, and can list, on the memory 103, column arrangement candidates that differ for the respective sections that are delimited. A specific example method for further delimiting the respective sections and listing column arrangement candidates for these sections will be described later. As for the output specifications employed for this embodiment, it is assumed that sections cannot be included in columns and columns are always included in a section.

At step S306, from among the obtained column arrangement candidates, the column arrangement analysis unit 204 determines the column arrangement candidate that provides a high reproduction ratio of the logical structure that is analyzed by the logical structure analysis unit 203, wherein the determined column arrangement is the column arrangement for the body area. More specifically, when a plurality of column arrangement candidates are obtained at step S305, scoring for the respective column arrangements is performed based on the logical structure that is analyzed by the logical structure analysis unit 203, and the column arrangement pattern with the highest score is determined to be the column arrangement for the body area. In this embodiment, scoring is performed based on the number of character areas that are included in the column arrangement and that provide a sequential reading order. In other words, a higher score is allocated for the column arrangement that has a higher reproduction ratio for the logical structure of the original document. The scoring processing will be described later in detail. In a case wherein only one column arrangement candidate is obtained at step S305, the column arrangement analysis unit 204 determines that the obtained column arrangement candidate is the column arrangement for the body area.

At step S307, the column arrangement analysis unit 204 determines whether the processing for all the sections has been completed. When there is an unprocessed section, the processing is returned to step S304, or when there are no more unprocessed sections, the processing is terminated.

An example processing performed by the column arrangement analysis unit 204 shown in FIGS. 2 and 3 will now be described in detail while referring to FIGS. 4 to 12B.

Figure 4:
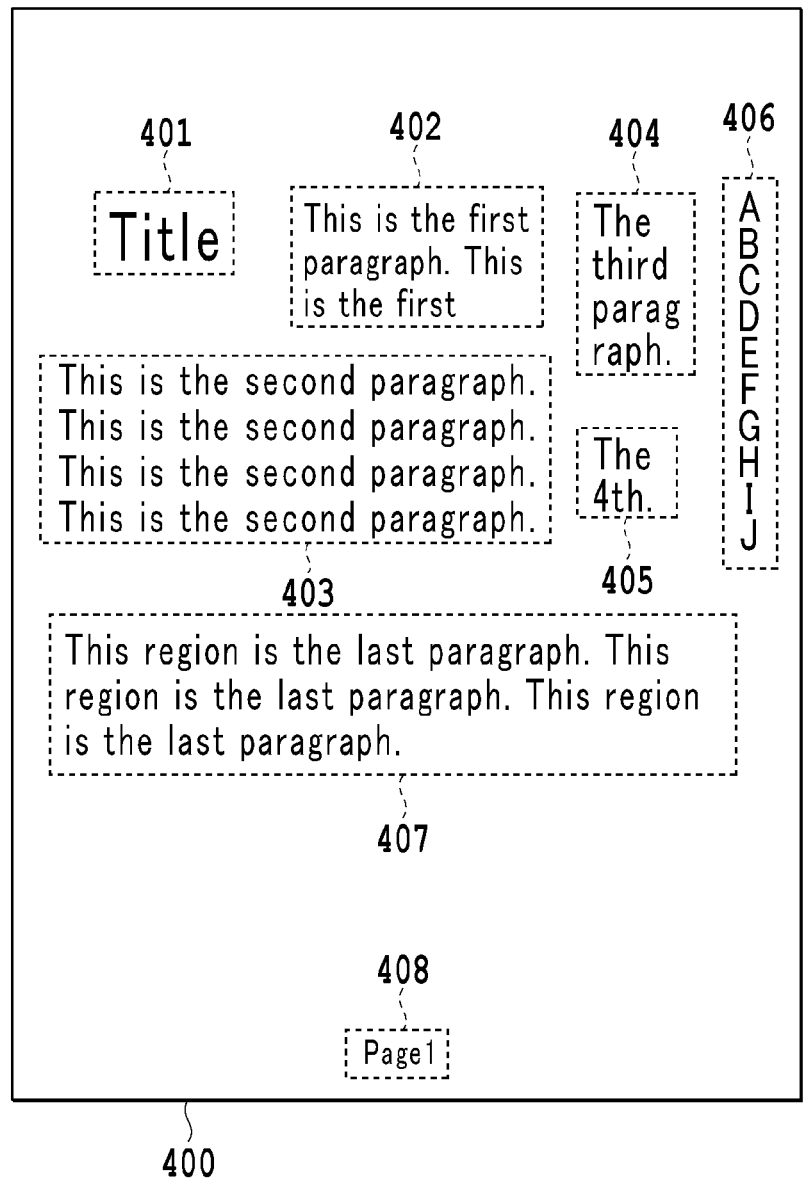
FIG. 4 is a diagram showing an example input image according to the first embodiment.

Input image data 400 shown in FIG. 4 is a specific example of the input image data 200 in FIG. 2. The input image data 400 is image data obtained by the scanner 101. Areas 401, 402, 403, 404, 405, 407 and 408, enclosed by broken lines, are character areas of horizontal writing, and an area 406 is a character area of vertical writing. The reference numerals provided for the respective character areas indicate area IDs.

FIG. 5 is a diagram showing an example of resultant data obtained when the area analysis unit 201 has performed the area analysis processing for the input image data 400, the character recognition unit 202 has performed the character recognition processing for the character areas, and the logical structure analysis unit 203 has additionally provided the logical structure information. Information obtained from the respective character areas is shown in FIG. 5. The writing direction of characters and area coordinate information are obtained by using a well-known area analysis technique. Information about character strings, the number of characters, a character size and the number of lines, is obtained by performing a well-known character recognition processing. The thus obtained information is merely an example, and information about font effects, such as character colors, font weight and font style, and character spacing and line spacing may also be obtained. Furthermore, in this embodiment, information about the order of reading the areas obtained by the well-known technique is additionally provided as information concerning a logical structure.

At step S301, the column arrangement analysis unit 204 determines the writing direction of characters for the entire document. Based on the writing directions for the character areas 401, 402, 403, 404, 405, 406, 407 and 408, the total character count for horizontal writing and the total character count for vertical writing are compared with each other, and the direction in which the greater number of characters is aligned is determined as the writing direction of characters for the entire document. According to the input image data 400, the total of characters for horizontal writing is 158, while the total of characters for vertical writing is 10, and therefore, it is determined that the writing direction of characters for the entire document is horizontal writing, and the processing advances to step S302.

At step S302, the column arrangement analysis unit 204 examines the character areas 401 to 408 to determine whether these areas are non-body areas. An area determined to be a non-body area is excluded from the body area, and does not count as an object to be processed in the following processing. In this embodiment, the character area 406 that does not match the writing direction of characters determined at step S301 is excluded from the body area. Further, a character area located within a range of 10% from the upper end of a page is defined as a header, while a character area located within a range of 10% from the lower end is defined as a footer, and the character areas present within the ranges are excluded from the body area. According to the example in FIG. 4, the character area 408 is present in the footer, and is excluded from the body area. In this embodiment, determination of a header and a footer is performed using this processing; however, the time required to perform this determination processing is not limited to this processing time. The logical structure analysis unit 203 may identify character areas as a header and a footer in advance, and may add attribute information concerning the header and the footer to the information obtained from the input image data 200, and a determination as to whether a character area is a non-body area may be made based on the attribute information.

Figure 3:
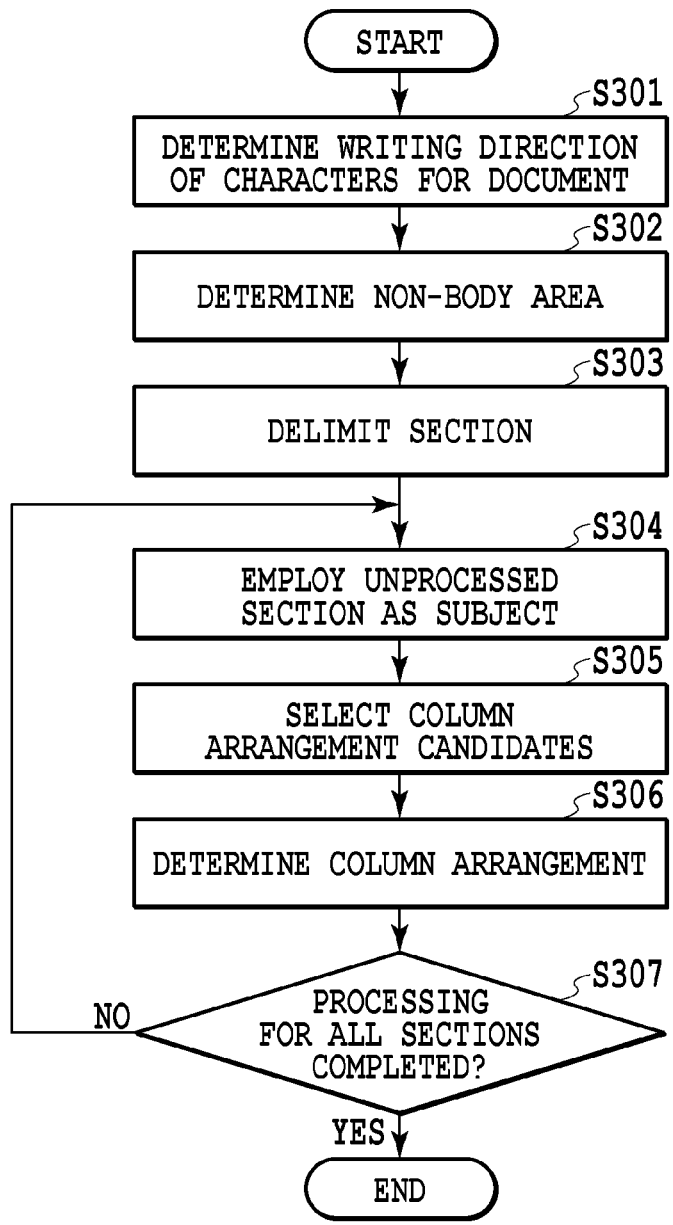
FIG. 3 is a flowchart showing the processing performed by a column arrangement analysis unit according to the first embodiment.

In the succeeding processing (steps S303 to S307) shown in the flowchart in FIG. 3, the character areas 406 and 407 that are identified as non-body areas are excluded from those to be processed.

Figure 6:
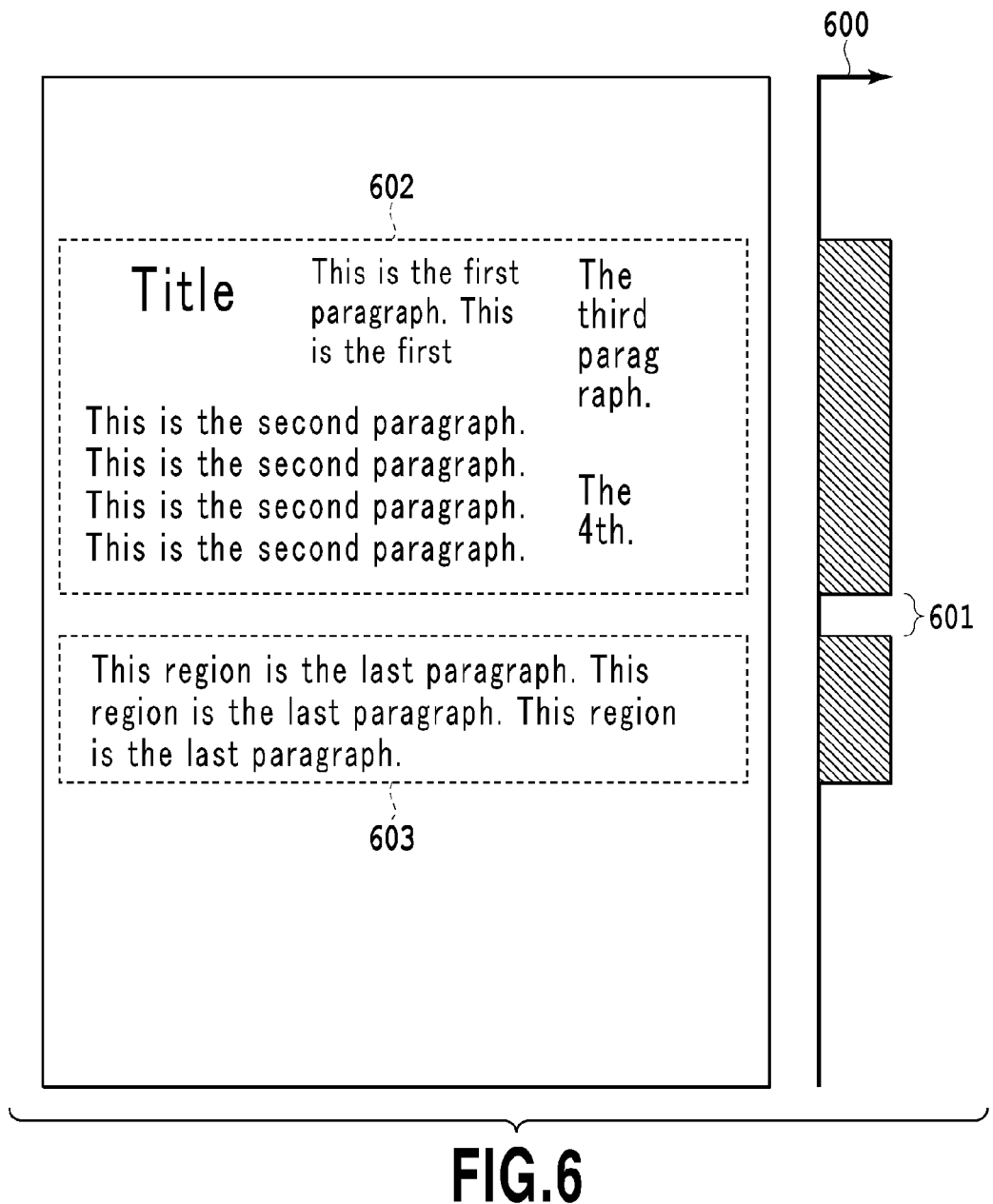
FIG. 6 is a diagram showing an example projection for character areas according to the first embodiment.

At step S303, the column arrangement analysis unit 204 performs a projection of character areas, and delimits the document by sections. In this embodiment, since it is ascertained at step S301 that the writing direction of characters for the document is horizontal writing, projection is performed along the horizontal axis. For the projection along the horizontal axis, an initial value of 0 is set for all the intervals obtained by separating the vertical axis of a page by using a predetermined range, and a value of 1 is set for the respective intervals where a character area to be processed is located along the horizontal axis. The intervals that are set as 0 are extracted as section delimiter positions. In this embodiment, an example 600 in FIG. 6 shows the results obtained by performing projection, along the horizontal axis to the vertical axis, of the character areas 401, 402, 403, 404, 405 and 407 of the input image data 400. In this example, a portion 601, wherein projection is not present (an interval where 0 is set), is extracted as a section delimiter. As a result, areas 602 and 603, enclosed by broken lines, are delimited as sections. A section delimiting method is not limited to this projection method, but a well-known method can also be employed.

At step S304, the column arrangement analysis unit 204 selects the section 602 as an unprocessed section, and the processing advances to step S305.

At step S305, the column arrangement analysis unit 204 selects, for the section 602, a column arrangement allowed by the output specification of the output electronic document data 210 having a predetermined format.

Figure 7:
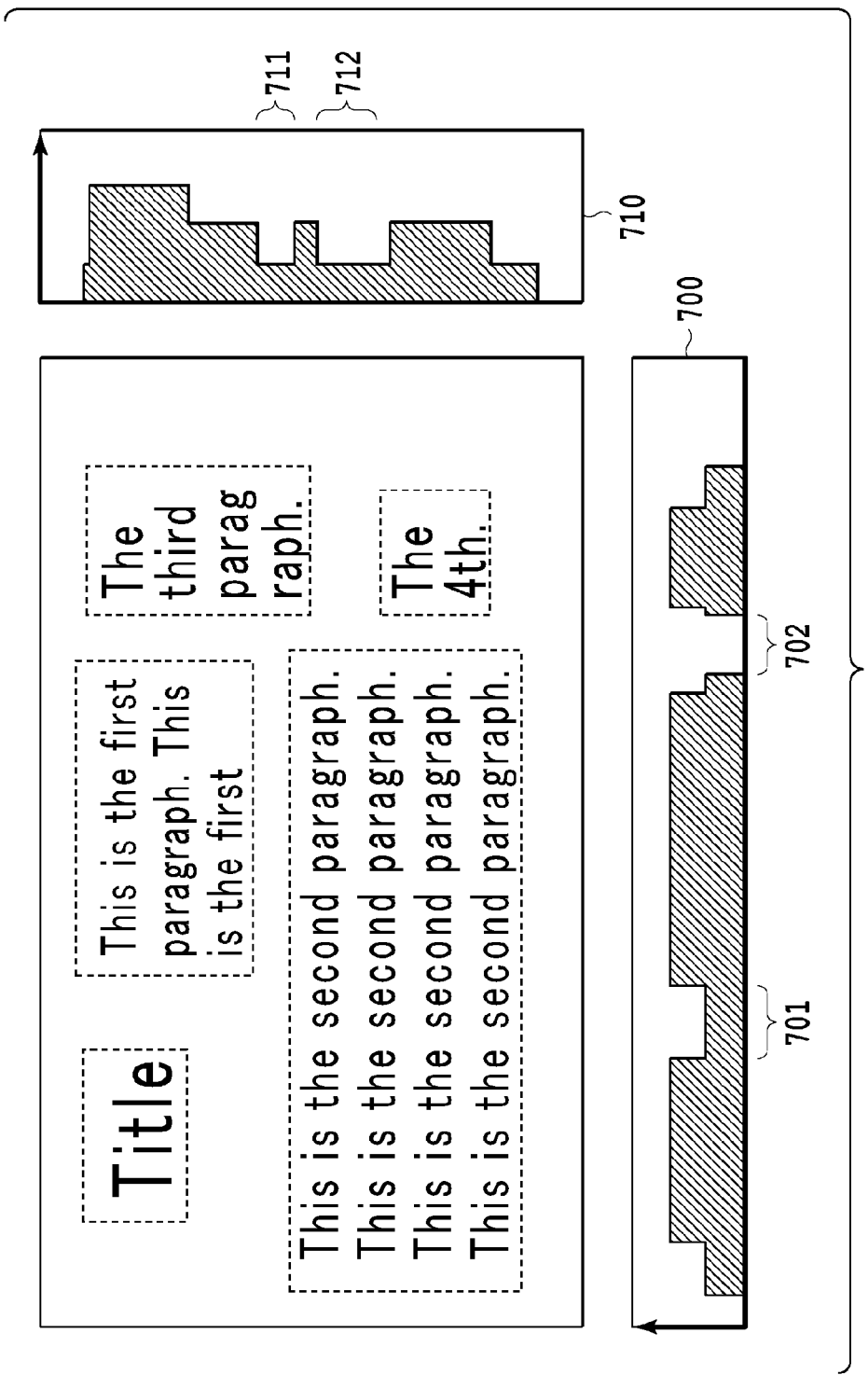
FIG. 7 is a diagram showing an example character area histogram for a section according to the first embodiment.

An example column arrangement selection method will now be described while referring to FIGS. 7 to 9.

First, a method for dividing the section 602 into smaller sections and columns will be described while referring to FIG. 7. FIG. 7 is a diagram showing an example wherein the histograms of character areas are provided in the vertical and horizontal directions. A histogram 700 is a histogram along the vertical axis, and the number of character areas that are found by scanning the section along the vertical axis is employed as the height of the histogram 700. A histogram 710 is a histogram along the horizontal axis, and the number of character areas found by scanning the section along the horizontal axis is employed as the height (the width) of the histogram 710. The method for employing the number of character areas as the height of histogram is merely an example, and the width or the height of the character areas, or the number of characters or lines, may also be employed as the height of the histogram. For obtaining the column arrangement, the valleys or shallow portions of the histogram are employed as boundary candidates to delimit the sections or columns.

Figure 8:
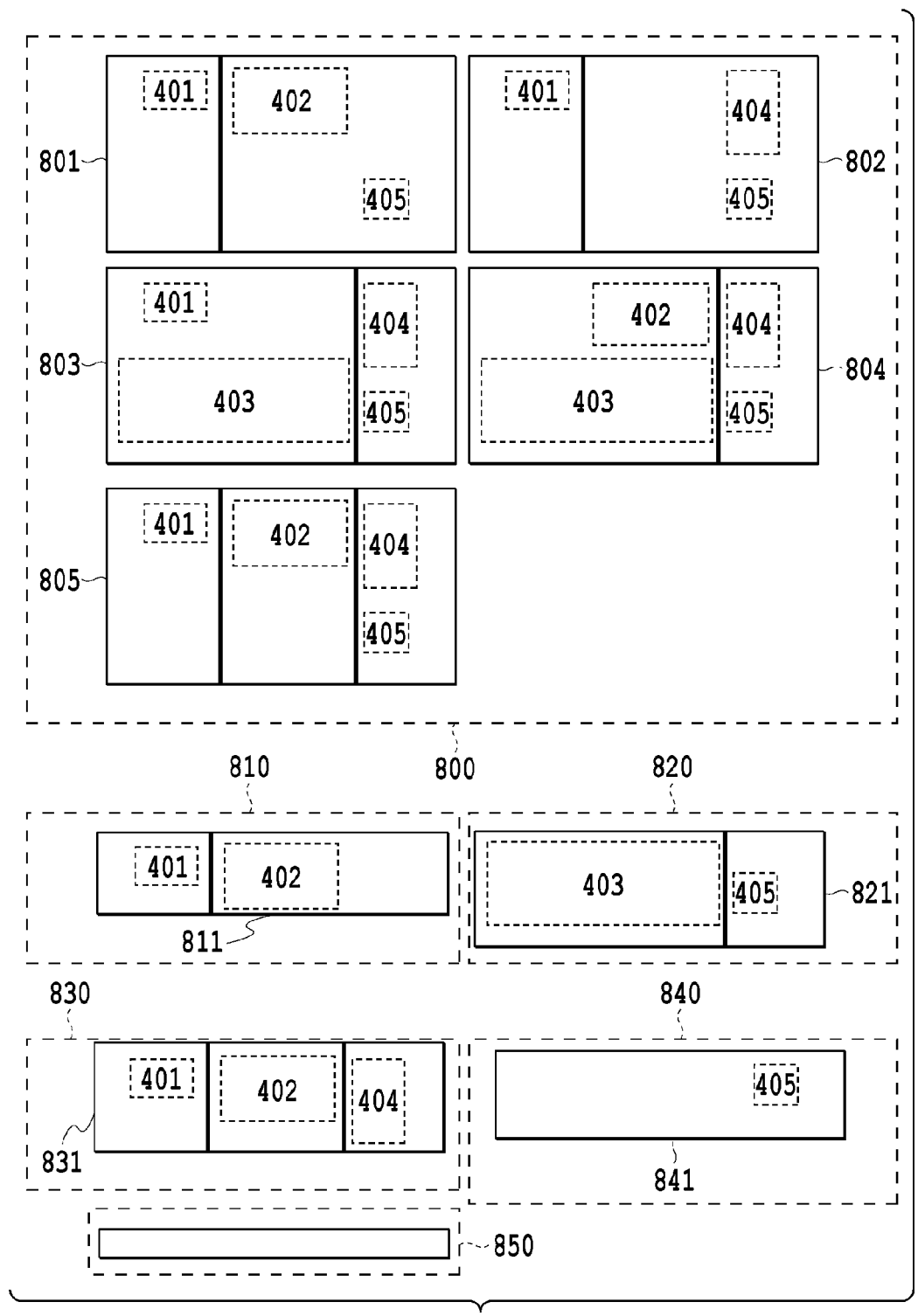
FIG. 8 is a diagram showing example column arrangement candidates according to the first embodiment.

FIG. 8 is a diagram showing example column arrangement candidates that are selected from those obtained for the section 602 in FIG. 6 at step S305. Here, as column arrangement candidates (arrangement candidates), column arrangements are selected by using which there are a predetermined number or more character areas, the positions of which in the input image data 200 can be reproduced as body areas of the column arrangement.

First, as previously described, boundary candidates 701 and 702 are obtained in accordance with the histogram 700. In FIG. 8, a candidate group 800 is shown as an example where the boundary candidates 701 and 702 for the section 602 are employed to select a group of candidates as column arrangements where character areas can be arranged in accordance with the electronic document format. In a case wherein the section 602 is delimited by the boundary candidate 701, column arrangements 801 and 802 are example candidates. In a case wherein the section 602 is delimited by the boundary candidate 702, column arrangements 803 and 804 are example candidates. In a case wherein section 602 is delimited by the boundary candidates 701 and 702, a column arrangement 805 is an example candidate. At this time, a column arrangement by using which there are a predetermined number or more character areas having positions in the image data 200 that can be reproduced, is selected as an arrangement candidate. For example, the group 800 includes only patterns whereby the maximum number of character areas is provided when the section 602 is delimited by the respective boundaries. That is, patterns other than the column arrangements 801 and 802 for the section 602, delimited by the boundary 701, are excluded (e.g., patterns consisting of only two character areas, such as the character areas 401 and 402, are excluded). Of course, all of the patterns may also be obtained, without exception.

At this time, as previously described, when the section 602 is further divided into section segments, patterns for different column arrangements can be obtained. In this embodiment, section delimiter candidates 711 and 712 are obtained based on the valley portions of the horizontal axis histogram 710. These section delimiter candidates are employed to obtain column arrangement patterns for the respective section segments. There are three cases in which division of the section 602 into section segments is performed: a case wherein the section 602 is divided along the section delimiter candidate 711, a case wherein the section 602 is divided along the section delimiter candidate 712, and a case wherein the section 602 is divided along the section delimiter candidate 711 and the section delimiter candidate 712 to obtain three section segments. When a group of column arrangement patterns is obtained for each section, a column arrangement group 810 is provided for the upper section segment delimited by the section delimiter candidate 711, and a column arrangement group 820 is provided along the lower section segment. Similarly, when the section 602 is divided along the section delimiter candidate 712, a column arrangement group 830 is obtained for the upper section segment, and a column arrangement group 840 is obtained for the lower section segment. Further, when the section 602 is divided along the section delimiter candidates 701 and 702, a column arrangement group 850 is obtained as a new column arrangement group candidate for the section segment that is sandwiched by these two section delimiter candidates. The column arrangement group 810 includes a column arrangement 811, which consists of two columns that are delimited along the delimiter candidate 701. The column arrangement group 820 includes a column arrangement 821, which consists of two columns delimited along the delimiter candidate 702. The column arrangement group 830 includes a column arrangement 831, which consists of three columns delimited by the delimiter candidates 701 and 702. A column arrangement group 840 includes a column arrangement 841 that consists of a single column. The column arrangement group 850 does not actually include column arrangement candidates because there are no character areas that can be arranged.

Finally, the column arrangement groups 810 to 850 are combined to determine a column arrangement that forms the section 602. The column arrangement candidates that can be used to form the section 602 are a column arrangement provided by combining the column arrangement groups 810 and 820, a column arrangement provided by combining the column arrangement groups 830 and 840, and a column arrangement provided by combining the column arrangement groups 810, 850 and 840. Further, these column arrangements and the column arrangement group 800 previously described are regarded as all of the candidates for the column arrangement of the section 602.

Figure 9:
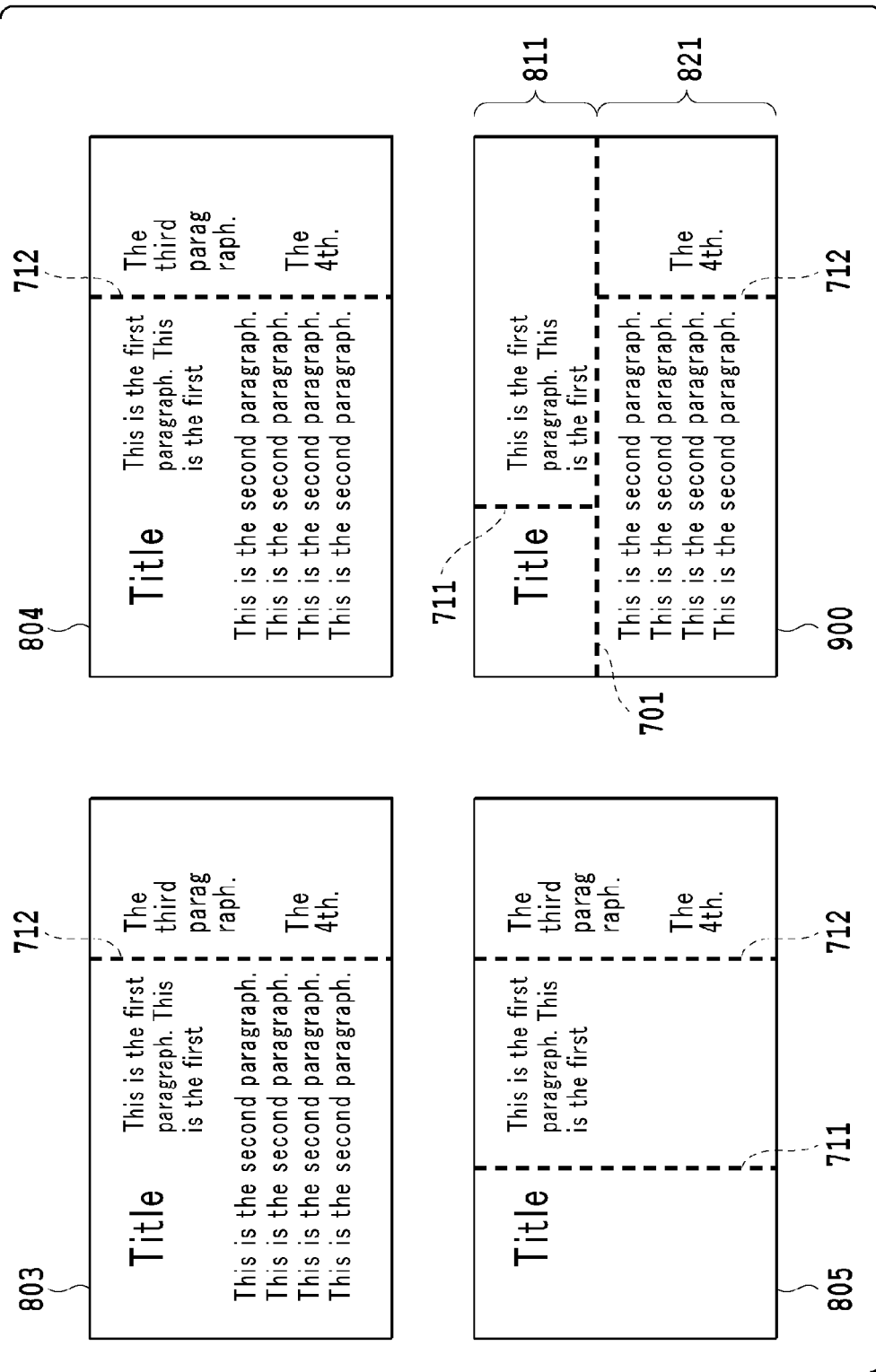
FIG. 9 is a diagram showing example column arrangement candidates according to the first embodiment.

The main example for the column arrangement candidates is shown in FIG. 9. In this example, the column arrangements 803, 804 and 805, and the column arrangement 900, which consists of the column arrangements 811 and 821, are shown as column arrangement candidates. In this case, four patterns are especially employed for the description; however, in actuality, all of the combinations of the column arrangements are employed to enumerate column arrangement candidates without exception. Of course, this method for acquiring column arrangement patterns is merely an example, and another method is also available.

As described above, at step S305, the column arrangement analysis unit 204 examines the column arrangements allowed by the specification for the output electronic document data 210, and selects, as arrangement candidates, column arrangements wherein there are a predetermined number or more of character areas, the positions of which can be reproduced in the input image 200.

At step S306, the column arrangement analysis unit 204 employs the logical structure information for calculating the scores for the respective column arrangement patterns, which are obtained at step S305, and determines which column arrangement has the highest score.

FIG. 10 is a diagram showing example scores for the logical structures obtained for the respective column arrangement candidates. In the table shown in FIG. 10, column "Character Area" shows values entered into sets of rectangles, of two rows each, where entries in the upper row indicate the area ID of the character area, while entries in the lower row indicate the reading order of the pertinent area. For example, as represented, the column arrangement 803 consists of a character area 401 having a reading order of 1, a character area 403 having a reading order of 3, a character area 404 having a reading order of 4 and a character area 405 having a reading order of 5. When the character areas are arranged in the ascending order of reading, and when the reading orders for two of the character areas are sequential, one point is added to the score. According to the example for the column arrangement candidate 803, the reading orders for the character area 403 and 404 are sequential, i.e., 3 and 4, and one point is added. Further, the reading orders for the character areas 404 and 405 are also sequential, i.e., 4 and 5, and therefore, one more point is added. Thus, the score of the column arrangement candidate 803 is the total two points. When score calculation is performed in the same manner for the other column arrangements, the score of the column arrangement candidate 804 is 3, the score of the column arrangement candidate 805 is 2, and the score of the column arrangement candidate 900 is 2. As a result, the column arrangement candidate 804 having the highest score is determined to be a column arrangement. That is, the logical structure analyzed by the logical structure analysis unit 203 includes the reading order of the character areas, and when the character areas are arranged in the column arrangement candidate, and when continuity in accordance with the reading order is appropriately achieved for the character areas, the column arrangement analysis unit 204 determines that the pertinent arrangement candidate provides an appropriate reproduction for the logical structure.

As a modification, instead of being added, a point may be subtracted from the score of the logical structure. For example, there is a case wherein an incorrect character area is identified by the area analysis unit 201. Then, the logical structure analysis unit 203 employs a well-known method to analyze the character area, identified by the area analysis unit 201, and to identify the character area that was erroneously identified. The column arrangement analysis unit 204 then subtracts the point for the logical structure that was additionally provided due to the presence of the erroneously identified character area.

Specifically, according to this modification, the logical structure obtained by the logical structure analysis unit 203, through the analysis of the character areas, includes information for the character area that was erroneously identified by the area analysis unit 201. When the character areas are arranged in the column arrangement, and when such many erroneously identified character areas appear in the arrangement column, the column arrangement analysis unit 204 determines that this arrangement candidate provide a poor reproduction for the logical structure.

As described above, at step S306, the column arrangement analysis unit 204 selects, from the arrangement candidates, the column arrangement by using which the logical structure analyzed from the input image data 200 can be most appropriately reproduced.

At step S307, the column arrangement analysis unit 204 determines whether the processing has been completed for all of the sections. In this example, since there is still an unprocessed section, the processing is returned to step S304. At step S304, the column arrangement analysis unit 204 selects the section 603 as an object to be processed, and the processing advances to step S305.

At step S305, the column arrangement analysis unit 204 performs a computation to provide the column arrangement candidates for the section 603. Since the section 603 consists of only the character area 407, only one combination is determined.

At step S306, since only one column, consisting of the character area 407, is provided as a combination of column arrangements, the column arrangement analysis unit 204 determines this column arrangement is the most appropriate for the section 603.

At step S307, since the processing has been completed for all of the sections, the processing is terminated.

As described above, according to the processing shown in FIGS. 3 to 10, the column arrangement analysis unit 204 selects a column arrangement to generate the output electronic document data 210 from the input image data 200. Specifically, from among the column arrangements allowed by the specification of the output electronic document data 210, the column arrangement analysis unit 204 selects the column arrangement by using which the positions of the character areas in the input image data 200 and the logical structure identified and analyzed from the input image data 200 can be most appropriately reproduced.

XML document data 1100 shown in FIG. 11 is an example of the output electronic document data 210, which is generated by the electronic document output unit 205 based on the column arrangement that is selected by the column arrangement analysis unit 204 (step S306 in FIG. 3) and the character recognition results obtained by the character recognition unit 202. The electronic document output unit 205 generates the output electronic document data 210 that includes, at the least, information (character recognition result) of character areas whose positions in the input image data 200 can be reproduced as a main body of the column arrangement selected by the logical structure analysis unit 204, and information (the attribute information and character recognition result) of character areas whose positions in the input image data 200 cannot be reproduced as the main body of the selected column arrangement. In this embodiment, the XML document data 1100 includes information obtained by the area analysis unit 201, the character recognition unit 202 and the logical structure analysis unit 204 through the analysis and recognition processes. In this embodiment, the output electronic document data 210 is generated using the XML format; however, the format of the output electronic document data 210 is not limited to this format, and an arbitrary format can be employed.

The <Document> element represents the body area (i.e. the main body of the output electronic document). The body area includes information about the character areas that are identified from the input image data 200, and that can be arranged as a main body of the column arrangement selected by the column arrangement analysis unit 204. The body area is divided into two segments by <Section> elements indicating a group of sections. The first <Section> element includes two columns represented by the <Column> element. The <Paragraph> elements represent information of the respective character blocks, the information including character recognition result (i.e. character strings) of the body area). The layout for displaying the character blocks is adjusted based on a "left margin" attribute, which represents the left margin, or "size" attribute, which represents character size information.

The <Text> elements, independent of the body area, represent arbitrary arranged character areas. The arbitrary arranged character areas include attribute information and character strings of character recognition result corresponding to non-body areas, wherein the non-body areas are the character areas that are identified from the input image data 200, and that cannot be arranged as the main body of the column arrangement selected by the column arrangement analysis unit 204. As the attribute information in this embodiment, the <Text> element includes: information for the position (x, y) of the character area, information (size) for the font size of the characters in the character area and the information (orient) for the characters in the character area relative to the writing direction of characters.

Figure 12A:
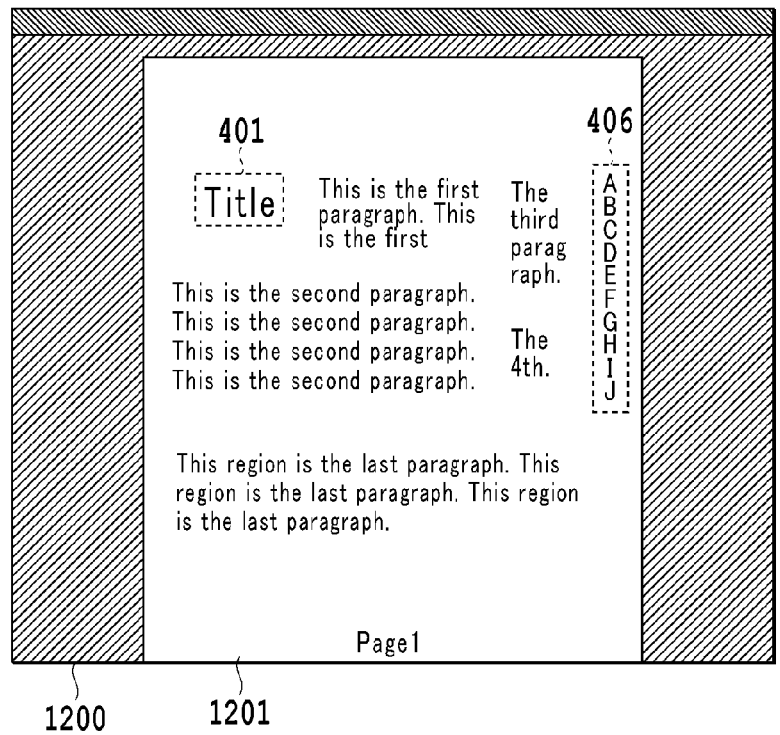
FIG. 12A is a diagram showing an example display of an electronic document according to the first embodiment.

FIG. 12A is a diagram showing an example wherein a document is displayed on the display unit of the personal computer 120 based on the XML document data 1100. Character area information included in the XML document data 1100 is set in columns, and is displayed in an application window 1200. Here, the input image data 200 originally includes the character areas 401 and 406 as columns of the column structure that are not allowed by the output specification for the XML document data 1100 having the predetermined format. However, since the XML document data 1100 includes, as arbitrary arranged character areas described above, information about the character areas 401 and 406, the personal computer 120 can display the document based on the XML document data 1100 while reproducing the visual aspect of the input image data 200.

Figure 12B:
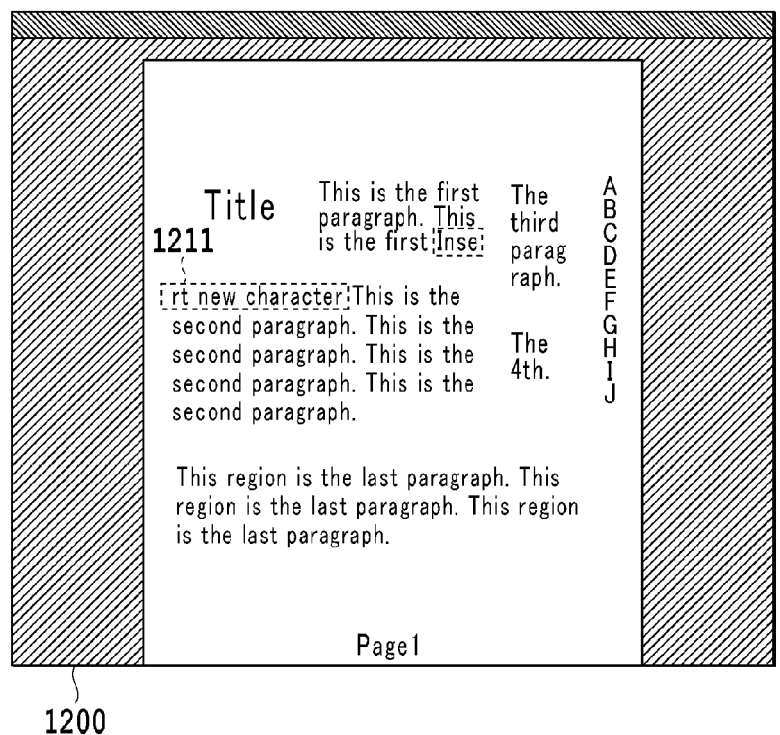
FIG. 12B is a diagram showing an example display of an electronic document according to the first embodiment.

FIG. 12B is a diagram showing an example wherein the document in FIG. 12A has been edited. As shown in an area 1211 enclosed by broken lines, character string "Insert new character" is inserted. Since the character areas included in the body area have continuity in accordance with the reading order, characters can be inserted, on this manner, across the two character areas. It should be noted that in the XML document data 1100 the order in which the <Paragraph> element appears corresponds to the order in which the character areas are read. However, as a modification, instead of employing this method, the XML document data 1100 may explicitly include information about the reading order.

Figure 13A:
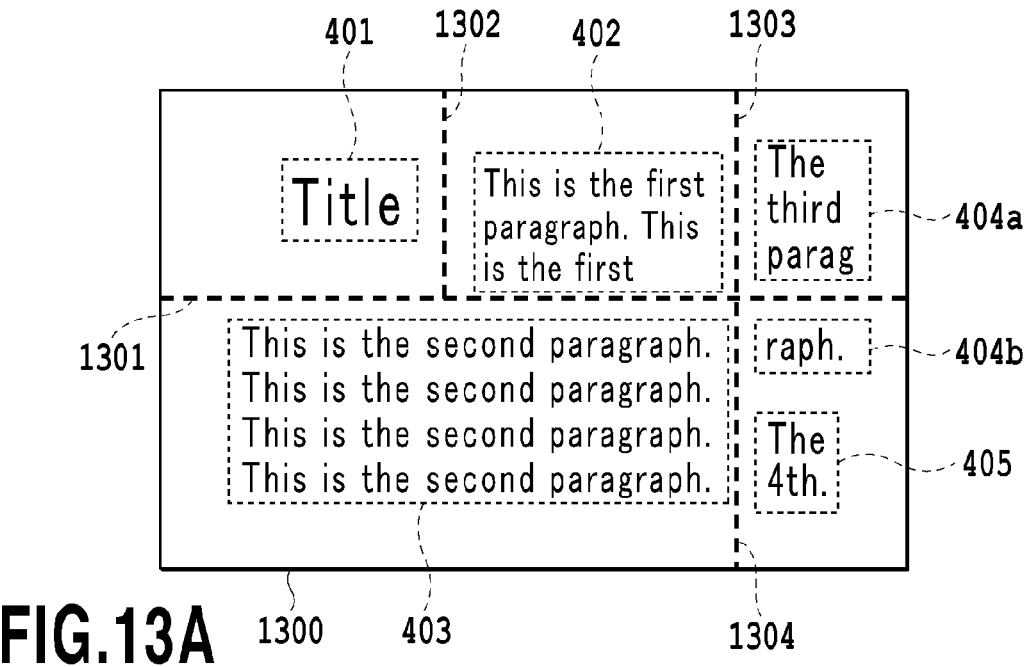
FIG. 13A is a diagram showing an example column arrangement provided without using a method for the first embodiment.
Figure 13B:
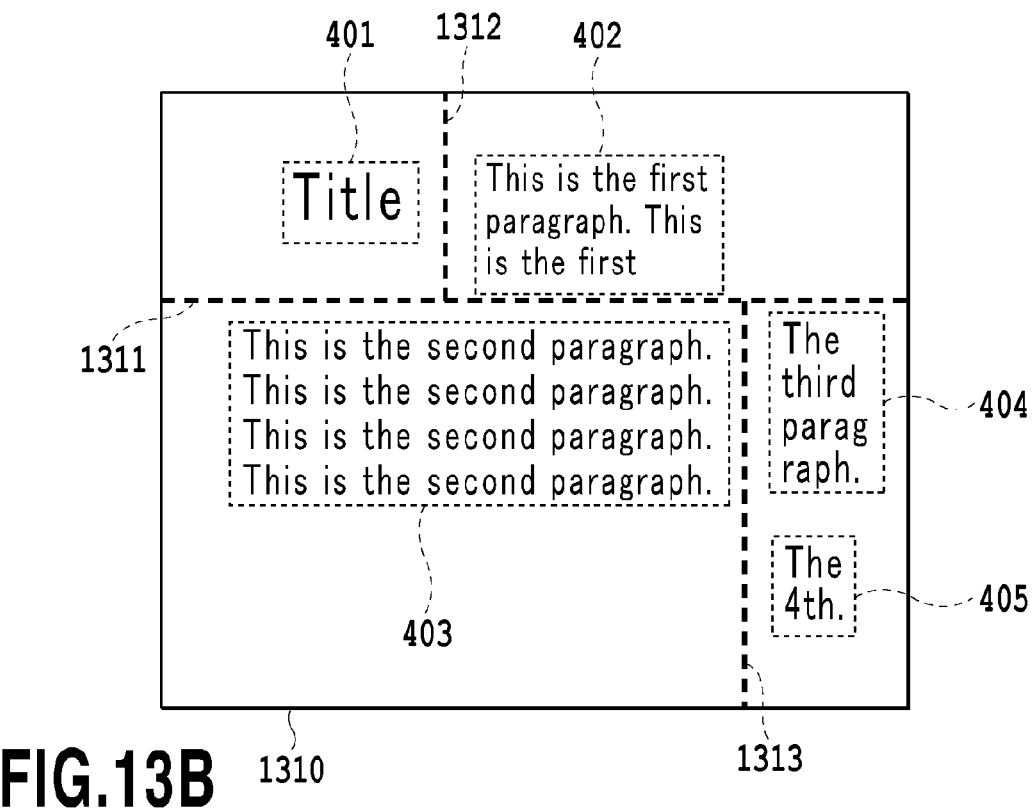
FIG. 13B is a diagram showing an example column arrangement provided without using the method for the first embodiment.

FIGS. 13A and 13B are diagrams showing an example electronic document in a case wherein electronic document data are generated by employing all of the character areas as a main body (the <Document> element), without employing the arbitrary arranged character areas. Electronic document data 1300 in FIG. 13A is an example wherein all of the character areas are fitted into the body areas, while the layout information for the section 602 is maintained. According to this example, the character area 404 is divided into an upper portion 404a and a lower portion 404b, and the section 602 is horizontally divided into two section segments along a section delimiter 1301. The upper section segment is divided into three columns, for which the character areas 401, 402 and 404a are respectively arranged. The lower section segment is divided into two columns, and the character area 403 is arranged in the left column while the character areas 404b and 405 are arranged in the right column. According to this example, the layout information is maintained, but the character areas for this document are read in the order 401, 402, 404a, 403, 404b and 405. As a result, since the character area 403 is present between the character areas 404a and 404b, which are obtained by dividing the character area 404 in which there is a single sentence, the electronic document data will have had a great loss information for the logical structure, i.e., information for the continuity of the reading order.

The electronic document data 1310 in FIG. 13B is an example wherein all of the character areas are fitted into the body areas, so as not to lose the logical structure for the section 602. The character areas 404 and 405 are shifted to lower positions to delimit the text area along the section delimiter 1311. The upper section segment consists of two columns, where the character areas 401 and 402 are respectively arranged, while the lower section segment consists of a column where the character area 403 is arranged and a column where the character areas 404 and 405 are arranged. According to this example, the logical structure is not lost, but the layout (the positions of the character areas), i.e., the appearance, is greatly deteriorated.

As is apparent from these examples in FIGS. 13A and 13B, the logical structure or the appearance of the document will be lost in a case wherein all of the character areas are employed as body areas, and are output by employing the column setting that conforms to the output specification of the electronic document format.

As described above, according to this embodiment, since information about the appearance of a document image is not lost and the logical structure is maintained as much as possible, an electronic document with high text editing performance can be generated.

Second Embodiment

For the first embodiment, the reading order has been employed as information for the logical structure that is employed for scoring points for the respective column arrangements. However, instead of the reading order, the importance of the content of the document may also be employed as information for the logical structure so as to score points for the column arrangements. In this embodiment, to perform scoring, the number of characters included in each character area is employed to access the importance of the content of a document. However, this is merely an example, and the content of a document may be semantically analyzed through natural language processing, and the obtained results may be employed as the importance of the document content to the performance of scoring.

Example processing performed for this embodiment will now be described in a case wherein image data 400 in FIG. 4 is employed as the input image data 200 in FIG. 2.

Since the processes performed by the area analysis unit 201 and the character recognition unit 202 in FIG. 2 are the same as those described in the first embodiment, no further explanation for them will be provided.

A logical structure analysis unit 203 obtains, as the importance level, the number of characters included in each character area. Here, a value indicating the number of characters obtained for each character area is represented in column "The Number Of Characters" in FIG. 5.

A column arrangement analysis unit 204 performs the processing in accordance with the flowchart in FIG. 3. Since the processes performed at steps S301, S302, S303, S304 and S305 are the same as those for the first embodiment, no further explanation for them will be given.

In the processing for a section 602 at step S306, scoring is performed for the respective column arrangement candidates based on the number of characters obtained by the logical structure analysis unit 203, and a column arrangement is determined. For a column arrangement pattern 803, a value of 151, which is the total of the number of characters in character areas 401, 403, 404 and 405, is employed as a total score. For a column arrangement pattern 804, a value of 192, which is the total of the number of characters in character areas 402, 403, 404 and 405, is employed as a total score. For a column arrangement pattern 805, a value of 78, which is the total of the number of characters in the character areas 401, 402, 404 and 405, is the total score. For a column arrangement pattern 900, a value of 178, which is the total of the number of characters in the character areas 401, 402, 403 and 405, is the total score. The column arrangement 804 that has the highest score of all is determined to be a column arrangement for the section 602.

That is, according to this embodiment, the logical structure, analyzed by the logical structure analysis unit 203, includes the importance level of a character area, which is determined based on the number of characters in the pertinent character area, that is identified by the area analysis unit 201. When the character areas identified by the area analysis unit 201 are arranged by using an arrangement candidate, and when the importance of the character areas thus arranged is high, the column arrangement analysis unit 204 determines that the pertinent arrangement appropriately reproduces the logical structure.

Since the succeeding processes to be performed are the same as those for the first embodiment, no further explanation will be given for them.

As described above, the same effects as are obtained in the first embodiment are also provided in this embodiment. That is, according to this embodiment, since important sentences are arranged in the body area, to the extent possible, without losing information concerning the appearance of a document image, an electronic document can be generated that provides a high text editing performance.

Third Embodiment

In the first embodiment, the reading order has been employed as a determination reference for a logical structure; however, for a logical structure, correlation between character areas and other areas, such as drawings, photographs and tables, may also be employed as a determination reference.

Figure 14:
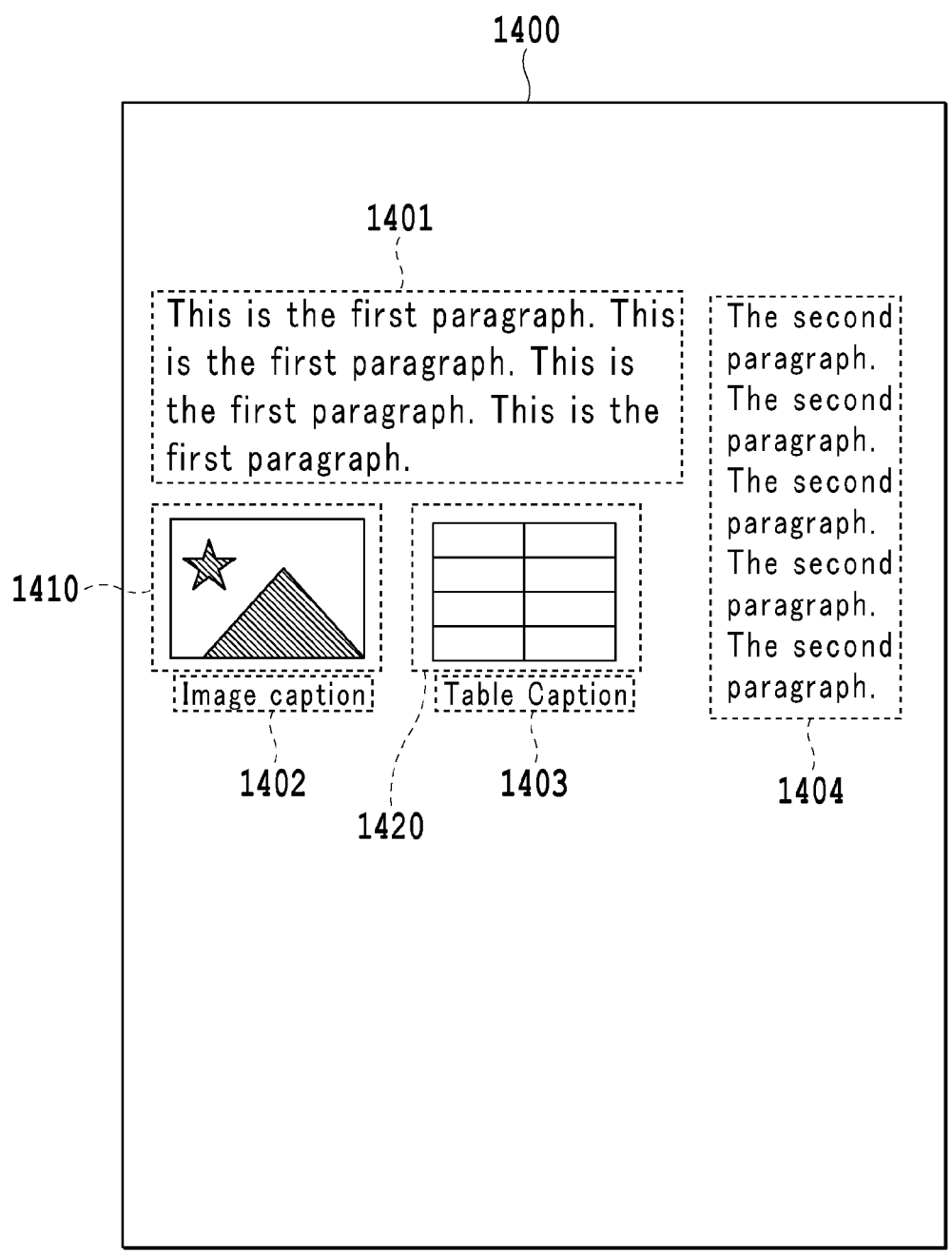
FIG. 14 is a diagram showing an example input image according to a third embodiment of the present invention.

Image data 1400 shown in FIG. 14 is an example for the input image data 200 shown in FIG. 2. The image data 1400 includes character areas 1401, 1402, 1403 and 1404, a photograph 1410 and a table 1420. The character area 1402 is a caption attached to the photograph 1410, and the character area 1403 is a caption attached to the table 1420. It is assumed that the character areas 1401 and 1404 provide important information concerning the content of the image data 1400.

The processing performed for this embodiment will now be described by employing the image data 1400 in FIG. 14 as an example for the input image data 200.

An area analysis unit 201 employs a well-known area analysis technique to analyze and identify a drawing, a photograph and a table, as well as a character area. For example, according to the area analysis technique disclosed in U.S. Pat. No. 5,680,478, image segments extracted from an image are categorized as characters, drawings and photographs, in accordance with the size and the shape. Further, an area wherein closed areas are aligned by being delimited by lines is extracted as a table.

In this embodiment, through the analysis of the area analysis unit 201, the areas 1401, 1402, 1403 and 1404 are identified as character areas, the area 1410 is identified as a photograph area and the area 1420 is identified as a table area.

There is a table where the text, which is a table element, is not delimited by lines, and during the identification processing, such a table may be extracted as a plurality of character areas. For this type of table, the logical structure analysis unit 203 may detect vertical and horizontal alignments of small text elements, and may collect, as a table area, the areas that are well aligned. To perform the detection of the alignment, a projection, such as is described while referring to FIG. 6, is performed for all of the small text elements in an area to be processed, and when a valley and a peak appear regularly in a histogram obtained by the projection, it can be determined that the text elements are aligned.

It should be noted that a method for identifying photographs, drawings and tables is not limited to the above described example, and a well-known method can be employed.

FIG. 15 is a table provided by adding, to the area analysis results, the processing results of a character recognition unit 202 and a logical structure analysis unit 203. It is assumed that through a well-known reading order determination processing, the reading order of character areas is determined to be 1401, 1402, 1403 and 1404.

A column arrangement analysis unit 204 performs the processing in accordance with the flowchart shown in FIG. 3.

At step S301, since the writing direction of characters for all of the character areas 1401 to 1404 is horizontal, the column arrangement analysis unit 204 determines that the writing direction of characters for the document is also horizontal.

At step S302, the column arrangement analysis unit 204 examines the respective character areas to determine whether or not the character area is a non-body area, and designates, as a body area, the character area, while excluding the non-body area. The character area that is not the body area is excluded from the target area for the following processing in FIG. 3. In this embodiment, for a character area having a line count of 1, the column arrangement analysis unit 204 calculates a distance between the midpoint of the upper side of a rectangle that indicates a drawing, photograph or table area, and the midpoint of the lower side of a rectangle that indicates a character area, or calculates a distance between the midpoint of the lower side of a rectangle indicating a table area and the midpoint of the upper side of a rectangle indicating a character area. Character areas having a distance of 10 (pixels) or less, are excluded by virtue of being regarded as captions. This calculation is performed by employing information shown in FIG. 5. As a result of this determination processing, since the distance between the midpoint (40, 140) of the upper side of the character area 1402 and the midpoint (40, 135) of the lower side of the photograph area 1410 is 5, the character area 1402 is regarded as a caption, and is excluded from the body area. Further, since the distance between the midpoint (100, 140) of the upper side for the character area 1403 and the midpoint (100, 134) of the lower side for the table area 1420 is 6, the character area 1403 is also regarded as a caption, and is excluded from the body area. Thereafter, in the same manner as in the first embodiment, the column arrangement analysis unit 204 performs the processing for steps S303 to S307. In other words, in this embodiment, the character areas regarded as captions based on the logical structure are excluded from the body area. Specifically, the column arrangement analysis unit 204 selects a column arrangement without taking into account the position and the logical structure of the character area that is identified by the area analysis unit 201, and that is regarded as a caption attached to either a photograph or a table.

Electronic document data 1600 in FIG. 16 is example electronic document data generated by an electronic document output unit 205. In the electronic document data 1600, one <Section> element is included in the <Document> element that represents a body area. In the <Section> element, two columns for the character areas 1401 and 1404 are represented by using the <Column> element. That is, the electronic document data 1600 is output with a column arrangement that includes one section, as a body area, and two columns wherein the character areas 1401 an 1404 are arranged.

Furthermore, the character areas 1402 and 1403 are output as <Text> elements, i.e., arbitrary arranged character areas independent of the text. The <Image> element represents an image to be displayed at a position designated by the x and y attributes, while referring to an image file, such as a photograph, and in this case, an image 1410 is designated.

The <Table> element represents a table that is output at a position designated by the x and y attributes, with columns having a width designated by the "col" attribute and rows having a height designated by the "row" attribute. In this case, the table area 1420 is written. In other words, based on the logical structure, a column arrangement can be determined by excluding a caption area that should not be included in the text.

As described above, since in this embodiment also the logical structure can be maintained, to the extent possible, without the loss of information concerning the appearance of the document image, an electronic document can be generated that provides a high editing performance.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-129016, filed Jun. 6, 2012, which is hereby incorporated by reference herein in its entirety.

What is claimed is:

1. An image processing apparatus for generating an electronic document from an image comprising:
    an identification unit configured to identify character areas in the image;
    a character recognition unit configured to perform a character recognition process on the identified character areas;
    a counting unit configured to count the number of characters in each of the identified character areas;
    a selection unit configured to select, from among column arrangements allowed by specifications of the electronic document, a column arrangement that arranges the greatest number of characters by using the number of characters in each of the identified character areas; and
    a generation unit configured to generate the electronic document based on the selected column arrangement and a result of the character recognition process.

2. A program stored in a non-transitory computer-readable medium for making a computer to function as an image processing apparatus according to claim 1.

3. The apparatus according to claim 1, wherein the number of characters arranged according to the selected column arrangement is greater than the number of characters to be arranged according to each of the others of the column arrangements allowed by specifications of the electronic document.

4. An image processing method, performed by an image processing apparatus for generating an electronic document from an image, comprising:
    an identification step of identifying character areas in the image;
    a character recognition step of performing a character recognition process on the identified character areas;
    a count step of counting the number of characters in each of the identified character areas;
    a selection step of selecting, from among column arrangements allowed by specifications of the electronic document, a column arrangement that arranges the greatest number of characters by using the number of characters in each of the identified character areas; and
    a generation step of generating the electronic document based on the selected column arrangement and a result of the character recognition process.

* * * * *